United States Patent
Boyle

(10) Patent No.: US 11,216,209 B2
(45) Date of Patent: Jan. 4, 2022

(54) SECURE STORAGE USING A REMOVABLE BRIDGE

(71) Applicant: Western Digital Technologies, Inc., San Jose, CA (US)

(72) Inventor: William Bernard Boyle, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/365,080

(22) Filed: Mar. 26, 2019

(65) Prior Publication Data

US 2020/0310678 A1 Oct. 1, 2020

(51) Int. Cl.
*H04L 9/32* (2006.01)
*G06F 3/06* (2006.01)
*G06F 21/34* (2013.01)
*G06F 13/40* (2006.01)
*G06F 21/60* (2013.01)

(52) U.S. Cl.
CPC .......... *G06F 3/0658* (2013.01); *G06F 3/0622* (2013.01); *G06F 3/0659* (2013.01); *G06F 3/0683* (2013.01); *G06F 13/4027* (2013.01); *G06F 21/34* (2013.01); *G06F 21/602* (2013.01)

(58) Field of Classification Search
CPC ....... G06F 21/10; G06F 21/602; G06Q 20/10; G06Q 50/24; H04L 9/3247; H04W 12/04071
See application file for complete search history.

(56) References Cited

U.S. PATENT DOCUMENTS

| | | | |
|---|---|---|---|
| 6,003,100 A | 12/1999 | Lee | |
| 6,601,140 B1* | 7/2003 | Okaue | G06F 21/10 |
| | | | 711/115 |
| 7,634,585 B2 | 12/2009 | Conley et al. | |
| 9,177,654 B2 | 11/2015 | Cerrillo et al. | |
| 2007/0214369 A1* | 9/2007 | Roberts | G06Q 50/24 |
| | | | 713/192 |
| 2008/0140921 A1 | 6/2008 | Sutardja et al. | |
| 2008/0204991 A1 | 8/2008 | Muraki | |
| 2008/0244734 A1* | 10/2008 | Okaue | G06F 21/32 |
| | | | 726/19 |
| 2009/0100273 A1* | 4/2009 | Miller | G06F 21/10 |
| | | | 713/193 |
| 2010/0211792 A1* | 8/2010 | Ureche | H04L 9/3247 |
| | | | 713/176 |
| 2010/0274677 A1* | 10/2010 | Florek | G06Q 20/10 |
| | | | 705/16 |

(Continued)

*Primary Examiner* — Ryan Bertram
*Assistant Examiner* — Trang K Ta
(74) *Attorney, Agent, or Firm* — Chang & Hale LLP

(57) ABSTRACT

A storage device comprises a storage medium, storage controller, a host interface, and a bridge slot. The storage controller is configured to control read and write operations to the storage medium and operates according to a firmware written by a storage device manufacturer. The bridge slot is configured to receive a removable bridge storing software written by a third-party different from the storage device manufacturer. The removable bridge is configured to intercept a first command sent from the host system to the storage controller, modify the first command according to the software stored on removable bridge, and transmit the first command to the storage controller.

20 Claims, 6 Drawing Sheets

(56) References Cited

U.S. PATENT DOCUMENTS

| | | | |
|---|---|---|---|
| 2013/0145451 A1* | 6/2013 | Berionne | H04W 12/04071 |
| | | | 726/9 |
| 2013/0332747 A1* | 12/2013 | Roberts | G06F 21/602 |
| | | | 713/192 |
| 2017/0131943 A1* | 5/2017 | Le | G11C 16/22 |
| 2018/0059742 A1* | 3/2018 | Jenkins | G11B 33/126 |
| 2018/0239912 A1* | 8/2018 | Welch | G06F 21/604 |
| 2020/0159682 A1 | 5/2020 | Allo | |

\* cited by examiner

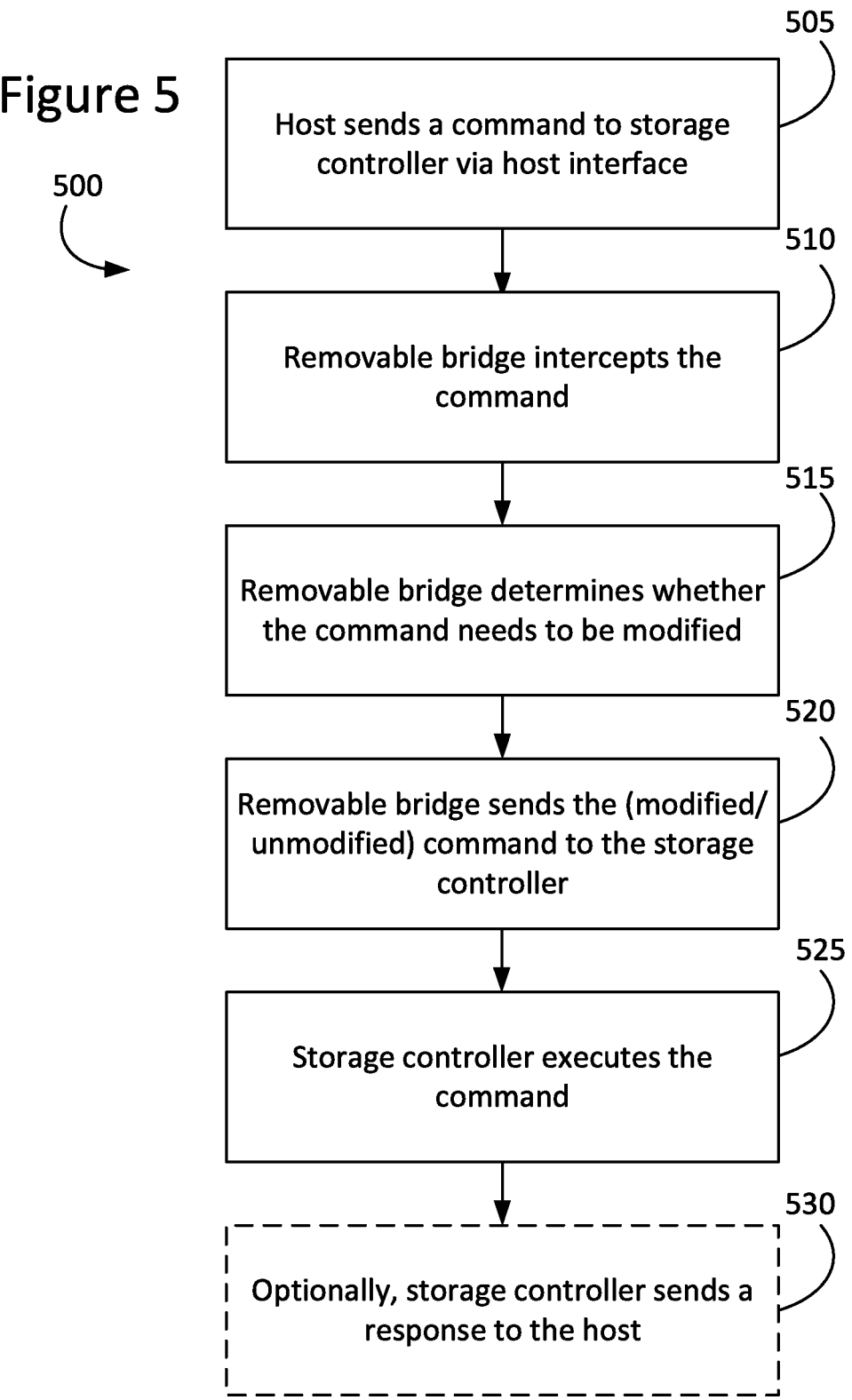

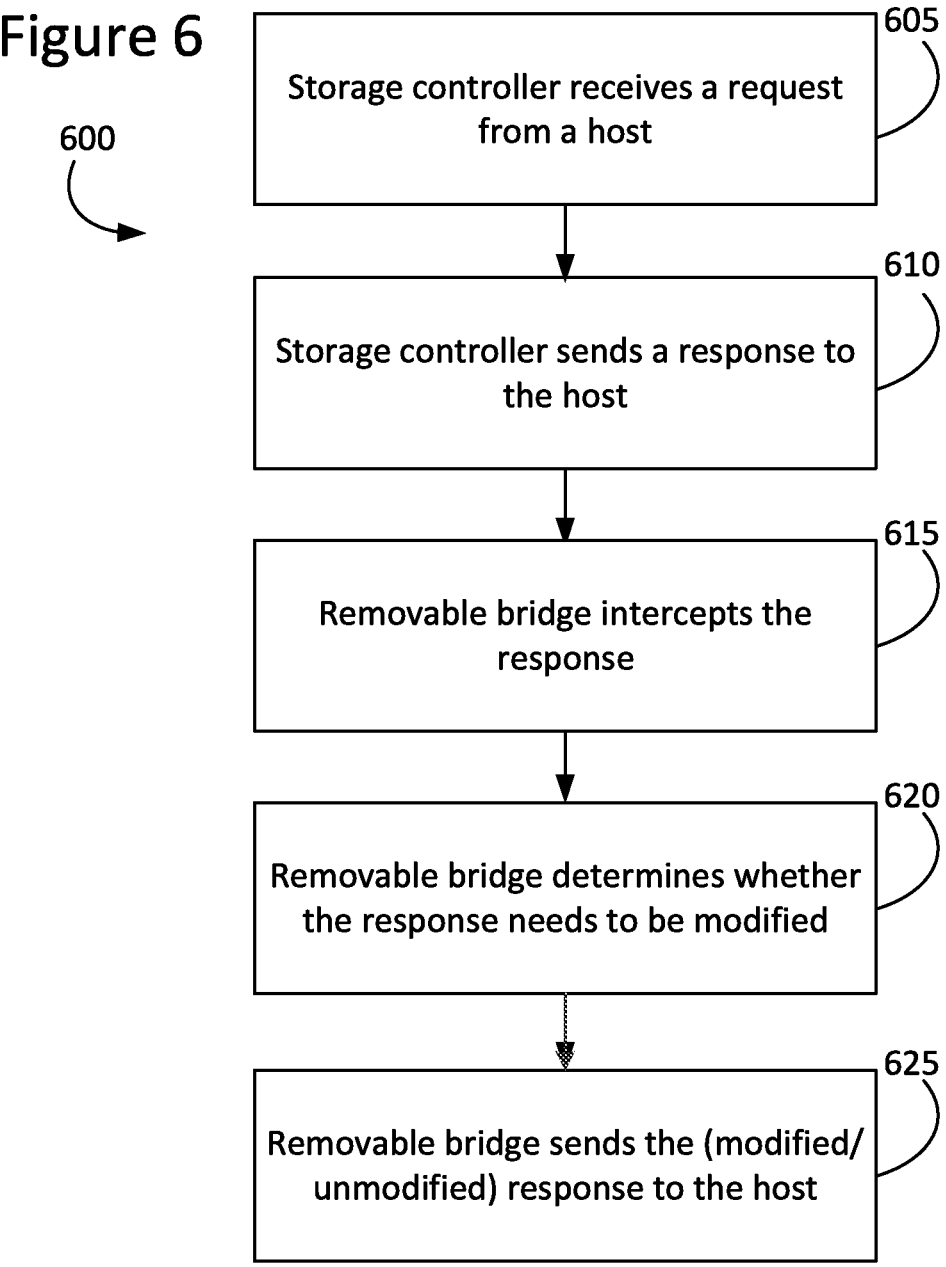

SECURE STORAGE USING A REMOVABLE BRIDGE

BACKGROUND

Field

This disclosure relates to storage devices. More particularly, the disclosure relates to systems and methods for securing storage devices using a removable bridge.

Description of Related Art

In certain computing systems, data storage devices may be encrypted and/or secured in some way. Such devices need to be unlocked before stored data can be accessed.

SUMMARY

Certain organizations have a need for highly secure data. In particular, some organizations want direct control over the security measures implemented for accessing such secure data. While software systems can be created in accordance with the needs of such organizations, such customizability becomes more difficult in terms of the hardware storing such data. Storage devices, such as hard disk drives (HDDs), solid-state drives (SSDs) or solid-state hybrid drives (SSHDs), are typically made by manufacturers according to a limited set of product lines. As the product lines are limited, it becomes difficult for the manufacturer to customize such devices for each specific organization. Furthermore, any customization to a product line would require implementation by the manufacturer. For security conscious organizations, that may be undesirable if they wish to keep security implementation details secret.

One potential solution is using a removable bridge in the storage device. The manufacturer could produce a storage device with a common interface and/or authentication process for the removable bridge. If the removable bridge followed certain conventions or protocols, the storage device could be configured to recognize the removable bridge and implement the secure access protocols stored on the removable bridge. Such a bridge could implement secure access protocols for the storage drive, but be programmed by a third party different from the storage device manufacturer. That way, an organization that purchases such storage devices could retain independent control of the secure access implementation, providing additional security for those organizations. The same concept can be extended to other applications such as compression, data processing/analytics, etc., in which the above described configuration opens a platform for customization and innovation by third party contributors as well as the storage device manufacturers themselves.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5 is a flow diagram illustrating an interception process, in accordance with some embodiments.

FIG. 6 is a flow diagram illustrating another interception process, in accordance with some embodiments.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to retrieval of addressing information of memory portions in computing devices, such as solid-state data storage devices.

Overview

In data storage devices and systems, certain processing operations may be performed by processing circuitry in communication with one or more storage media, and in communication with a host. Storage media such as SSDs are typically made up of a number of NAND packages, each with 1-8 NAND dies per package, with each die made of multiple planes, blocks and pages. Meanwhile, HDDs are typically made up of one or more platters with magnetic material on the surface being read by one or more heads. Processing circuity of a storage device can include a controller that manages operations of the device, including data storage and access as well as communication between the device and a host device. The processing circuitry can also include a removable bridge, which can be programmed by a third-party different from the manufacturer and added to the storage device to implement secure access protocols specific to that third-party.

In some embodiments, the removable bridge implements an authorization process to gain authorization to unlock the storage device and/or send commands to the storage controller. If the removable bridge does not pass the authorization process, the storage controller can keep the storage device locked and/or the data otherwise inaccessible.

Data Storage System

Figure 1:
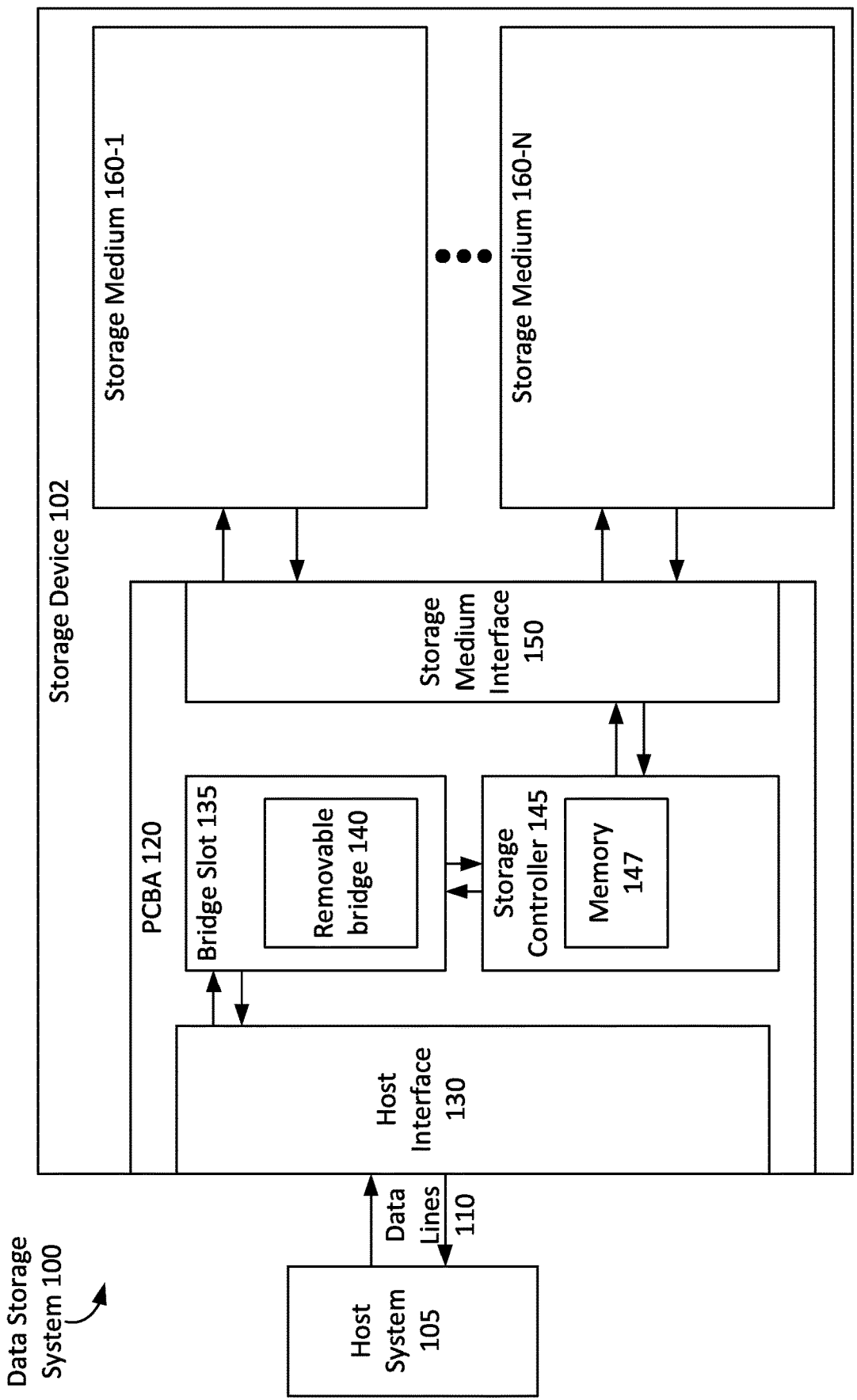
FIG. 1 is a block diagram illustrating an implementation of a data storage system, in accordance with some embodiments.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes a storage device 102 (e.g., SSD, SSHD, HDD or the like) in communication with a host system 105 through one or more data lines 110 (e.g., connectors, busses, etc.) connected to a host interface 130 on the storage device (e.g., Serial ATA (SATA), Serial Attached SCSI (SAS), non-volatile memory express (NVME) or the like). For example, the data storage system 100 may be a desktop, laptop, or a server system with multiple storage devices in a data center.

In some embodiments, the storage device 102 includes a Printed Circuit Board Assembly (PCBA) 120 comprising one or more components such as resistors, Integrated Circuits (ICs), and/or capacitors. Such components may include the host interface 130, a bridge slot 135 with a removable bridge 140, a storage controller 145 (sometimes referred to as a storage device controller, storage control circuitry or control circuitry) with associated memory 147, and a storage medium interface 150. The storage medium interface 150 can be configured to read/write to one or more storage media 160-1 to 160-N.

In some embodiments, a respective storage medium 160 may be a semiconductor die, or memory module comprising multiple die. In some embodiments, each storage medium 160 includes a memory controller (sometimes referred to as a memory die controller or storage control circuitry), and memory. In some embodiments, a respective storage medium may be one or more rotating magnetic media, along with associated circuitry for reading and/or writing to the media (e.g., read/write heads, head stack assembly, head gimbal assembly, etc.).

The host system 105 may be a computing device, such as a personal computer, a workstation or a computer server that includes one or more storage devices 102 and/or is connected (e.g., via a network, cable, etc.) to one or more separate storage devices 102. Host system 105 is sometimes called a computer system. Host system 105 may include one or more processors, one or more types of host memory, and a display and/or other user interface components such as a keyboard, a touch screen display, a mouse, a track-pad, a digital camera and/or any number of supplemental devices to add functionality.

Further, in some embodiments, host system 105 sends one or more host commands (e.g., read commands and write commands) on the data lines 110 to the storage device 102. The commands can be processed by the storage controller 145, which may then send data back to the host (e.g., in response to a read command or a status query). The storage controller may also be configured to perform management tasks of the storage device. The storage controller can comprise one or more processing units (also sometimes called CPUs, processors, hardware processors, microprocessors or microcontrollers) configured to execute instructions in one or more programs.

In some embodiments, the bridge slot 135 is in-line, electronically, between the host interface 130 and the storage controller 145. For example, in a first configuration with no bridge 140 in the slot 135, the electrical connection between the host interface and the storage controller is physically broken. No data or signal can pass through the bridge slot. In a second configuration with the removable bridge 140 inserted into the bridge slot, the removable bridge completes the electrical connection between the host interface and the storage controller, such that a signal or data can pass through bridge slot.

In some embodiments, the removable bridge 140 uses a common form factor, such as the Secure Digital (SD) format, microSD format, nanoSD format, or the like. By using a common form factor, parts may be easier to obtain or can be repurposed, lowering costs. Also, using a form factor such as microSD can allow the bridge to be read from readily available microSD readers, allowing easier programming of the removable bridge.

In one embodiment, the removable bridge 140 comprises a controller and memory (e.g., volatile such as DRAM and non-volatile such as flash memory). The bridge can be programmed with custom software (e.g., firmware or application) that affects how the storage device operates. Such custom software can extend the capabilities to the storage device. For example, the custom application can provide encryption/decryption capabilities that are customized to a particular organization. As that organization can create the custom application without involvement from the storage device 102 manufacturer, the organization may feel such storage devices 102 are more secure. Other use cases such as data processing/analytics, data integrity functions, compression, etc. are also possible in various embodiments. The removable bridge opens a platform for customization by third parties as well as the storage device manufacturers. The removability of the bridge also enables ease of upgrades and flexibility in re-purposing the storage devices for different applications.

In another embodiment, the removable bridge 140 may not have its own controller but instead stores, in memory, the custom application that is run by the storage controller 145. The storage controller 145 can be configured to, at startup or another time, run the custom application. In some embodiments, the storage controller 145 may confirm that the custom application follows certain protocols/interfaces or has been authenticated or validated before running the application.

In some embodiments, the removable bridge 140 intercepts or otherwise receives signals from the host system 105 (received through the host interface 130) to the storage controller 145. In some embodiments, circuitry in the removable bridge may receive and analyze a received host command and generate instructions for one or more circuits, components or modules of the storage device 102 in response to the analysis of the host command. For example, read or write commands can be intercepted by the bridge 140. Such commands can be processed by the bridge before sending them to the storage controller 145. Such processing can include encryption and decryption, compression and decompression, caching and/or the like.

In one embodiment, the bridge 140 is transparent to the host system 105. The host system 105 sends commands to the storage controller 145 using the same protocols and formats that are used when sending commands directly to the storage controller 145. In one example scenario, the host sends a command (e.g., a first SATA command) to the storage controller, the bridge intercepts the command and processes the command to create a modified command (e.g., a second SATA command). The bridge then sends the modified command to the storage controller. The storage controller then performs the modified command and generates a response for the host system. The bridge intercepts the response and performs further processing on the response, if needed, and then forwards the processed response to the host interface.

In the above scenario, neither the host system 105 nor the storage controller 145 "sees" the bridge. That is, the commands and responses are directed to the host system and the storage controller rather than to the bridge. However, while in some situations the bridge 140 can intercept commands, in other situations the bridge 140 can send commands to the storage controller 145 directly. For example, during an authentication process, the bridge 140 can identify itself to the storage controller 145 rather than remain transparent to the storage controller.

The storage medium interface 150 may be configured to facilitate transfer of information, such as instructions, commands, control signals and data, between storage controller 145 and one or more storage media 160. In some embodiments, storage medium interface 150 comprises circuitry and/or components to allow a communication exchange between the storage controller 145 and a respective storage medium 160. The storage medium interface 150 may be configured to control reading or writing components, such as heads and/or servos. The storage medium interface 150 may be included in storage controller 145. Alternatively, storage medium interface 150 may be included in the storage device 102 but not included in the storage controller 145.

In some embodiments, the storage controller 145 and/or removable bridge 140 include additional circuitry, modules or data structures not shown in FIG. 1. For example, the removable bridge 140 can include a processor, memory, and/or data interfaces. In some embodiments, two or more of the components may be combined in the same IC. For example, a system on a chip (SoC) could include both the storage controller 145 and the storage medium interface 150.

The term "control circuitry" is used herein according to its broad and ordinary meaning, and may refer to any circuitry, module, device or component of the storage device 102 configured to perform any of the functional aspects of the present disclosure. For example, one or any combination of the storage controller 145, the host interface 130, and/or the storage medium interface 150 can be referred to as "control circuitry."

Figure 2:
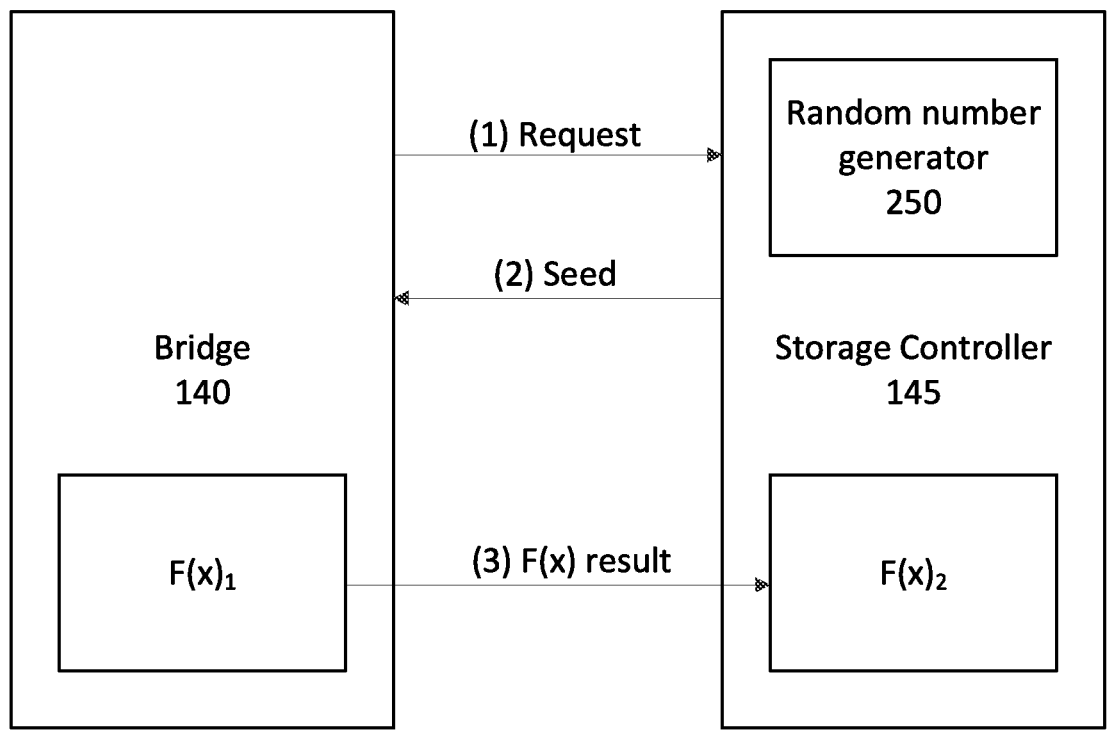
FIG. 2 illustrates a data flow for an authentication process of the data storage system 100, according to certain embodiments, in accordance with some embodiments.

FIG. 2 illustrates a data flow for an authentication process of the data storage system 100, according to certain embodiments. The authentication process can be performed when a removable bridge 140 is inserted into the bridge slot 135, when the storage device 102 powers up, and/or when some action triggers the process.

At step 1, a request for a seed is sent from the bridge 140 to the storage controller 145. The storage controller then generates a seed using a random number generator 250. This seed is retained by the storage controller to later authenticate the bridge 140.

At step 2, the seed is transmitted back to the bridge 140. The bridge can then use the seed as input into authentication function $F(x)_1$. The authentication function may be a hash-based or cryptographical-based function. Using the seed, $F(x)_1$ generates a first result.

In the illustrated embodiment, $F(x)$ is a function common to both the bridge and the storage controller. In one scenario, the storage device manufacturer implements $F(x)$ in the storage controller and in removable bridges. The manufacturer then provides the removable bridges to third-parties to install their custom software on. If another party creates removable bridges but lacks the correct authentication function, those removable bridges would be incompatible with the manufacturer's storage devices.

In other embodiments, the manufacturer may program the removable bridges itself rather than relying on third-parties. These manufacturer-made removable bridges can be used to customize the storage devise for particular customers or uses.

At step 3, the $F(x)_1$ result is transmitted to the storage controller 145. The storage controller uses the seed it generated and retained earlier as input into its own copy of the authentication function—$F(x)_2$. $F(x)_2$ generates a second result. The second result generated by the storage controller is compared to the first result transmitted from the bridge. If the results match, then the authentication functions should be the same (and presumably coming from the same manufacturer) and the removable bridge 140 is authenticated.

The above describes one possible authentication process. However, as will be apparent, other types of authentication schemes can be used. For example, a public-key cryptosystem (e.g., RSA, digital signature standard (DSS), etc.) can be used to authenticate the removable bridge.

Figure 3:
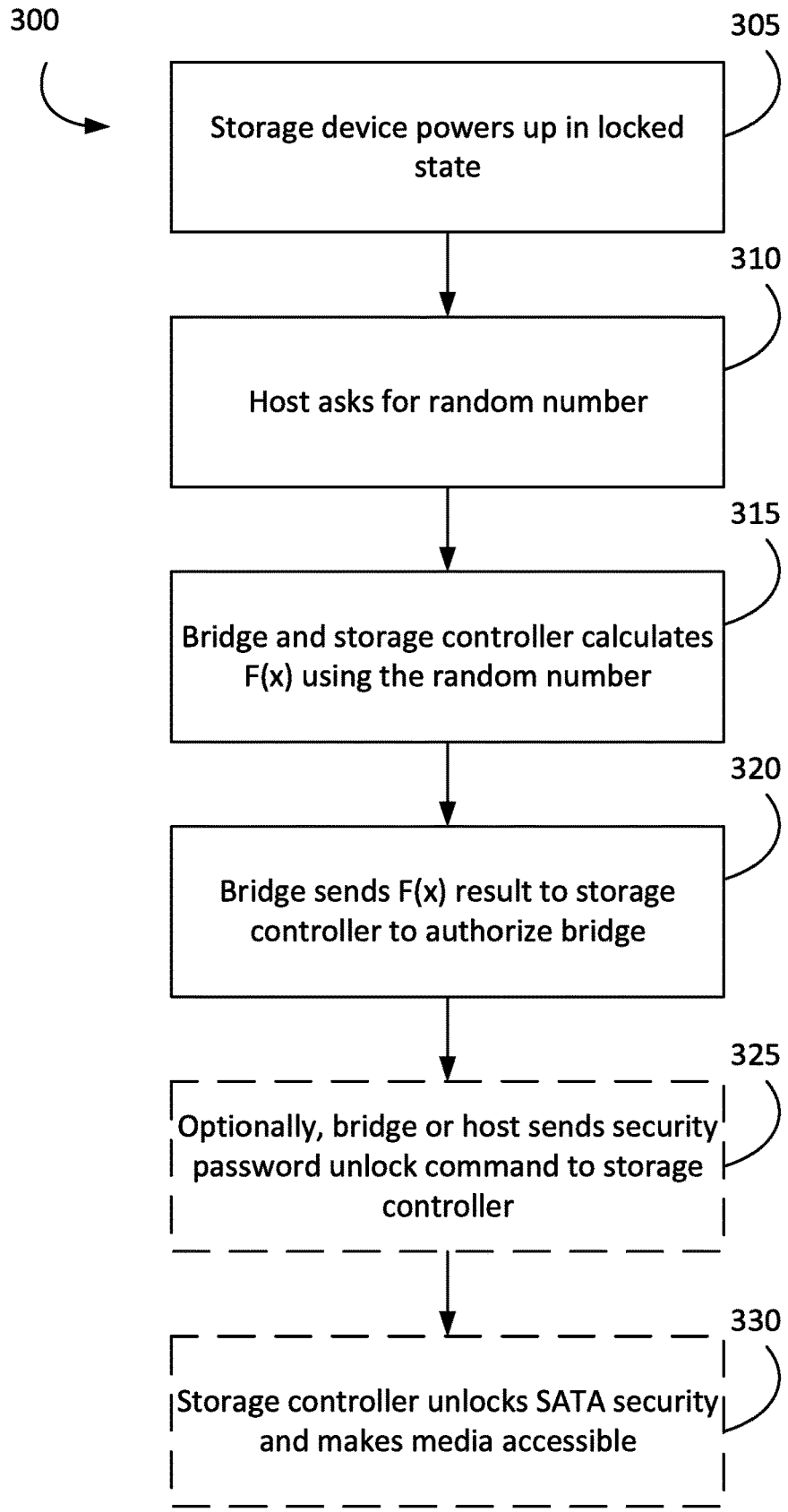
FIG. 3 is a flow diagram illustrating a process for an authentication process, in accordance with some embodiments.

FIG. 3 is a flow diagram illustrating an authentication process 300, in accordance with some embodiments of the data storage system 100. The authentication process 300 may be performed, for example, by control circuitry of a data storage system 100, such as the storage controller 145 and/or the removable bridge 140.

In the embodiment discussed below, authentication uses a two-part process. The first part involves the authentication of the bridge to the storage controller. This verifies that the bridge is authorized to work with the storage device. For example, if someone obtains a storage device and tries to unlock it using a counterfeit bridge, the storage device should reject the counterfeit bridge as it won't have the correct authorization data.

The second part of the authentication process involves unlocking media access commands. For example, the SATA specification includes provisions for locking the storage device, where all input/output (I/O) is blocked. The storage device can require a password to be entered before it unlocks access to the storage media. However, other embodiments of the authentication process do not require a two-part process and may be completed after the first part.

At block 305, the storage device 102 powers up. In an embodiment, the storage device 102 starts in a locked state, where no data access commands are permitted by the storage device. As such, a host system 105 connected to the storage device does not have access to the storage medium. For example, the storage device 102 may be configured to ignore read or write requests from the host system until the storage device 102 is unlocked. The locked state can comprise a SATA security password locked state and/or an authorization lock.

At block 310, the host system 105 asks for a random number from the storage device 102. The host interface 130 receives the request. The removable bridge 140 then receives the request (e.g., by intercepting a message to the storage controller 145). The removable bridge 140 then sends the request to the storage controller.

At block 315, the bridge 140 and the storage controller 145 calculate the $F(x)$ results using the random number, as discussed above in the data flow of FIG. 2. For example, the storage controller can generate the random number and send it to the bridge.

At block 320, the bridge sends the $F(x)$ result to the storage controller to authenticate itself, as discussed above in FIG. 2. The storage controller can independently calculate the $F(x)$ result to verify that the bridge is authorized by virtue of having the same $F(x)$ function. Assuming the results match, the bridge is deemed authorized by the storage controller and the controller will now accept additional commands from the bridge. At this point the first part of the authentication process is complete, but the media is still locked. However, in some embodiments, the media is not locked, and the authentication process is complete after the first part. In those embodiments, blocks 325 and 330 are optional.

At block 325, the bridge 140 (or host system 105) optionally sends a security password unlock command to the storage controller. In some embodiments, the SATA security may not be implemented or active and block 325 and block 330 are unnecessary.

At block 330, if the password is correct, the storage controller unlocks SATA security and makes the media accessible. However, if the password is incorrect, the media remains locked and inaccessible. The user may then attempt to enter the password again. In some embodiments, the storage controller may have a threshold on the number of incorrect passwords that can be entered before a protective action is taken. For example, the protective action may involve not accepting further password attempts for a set amount of time (e.g., 1 hour, 1 day, etc.) or even deleting data. Such a protective action may be decided by the owner of the storage drive and could be programmed into the removable bridge as part of organization-specific settings for the storage device.

Figure 4:
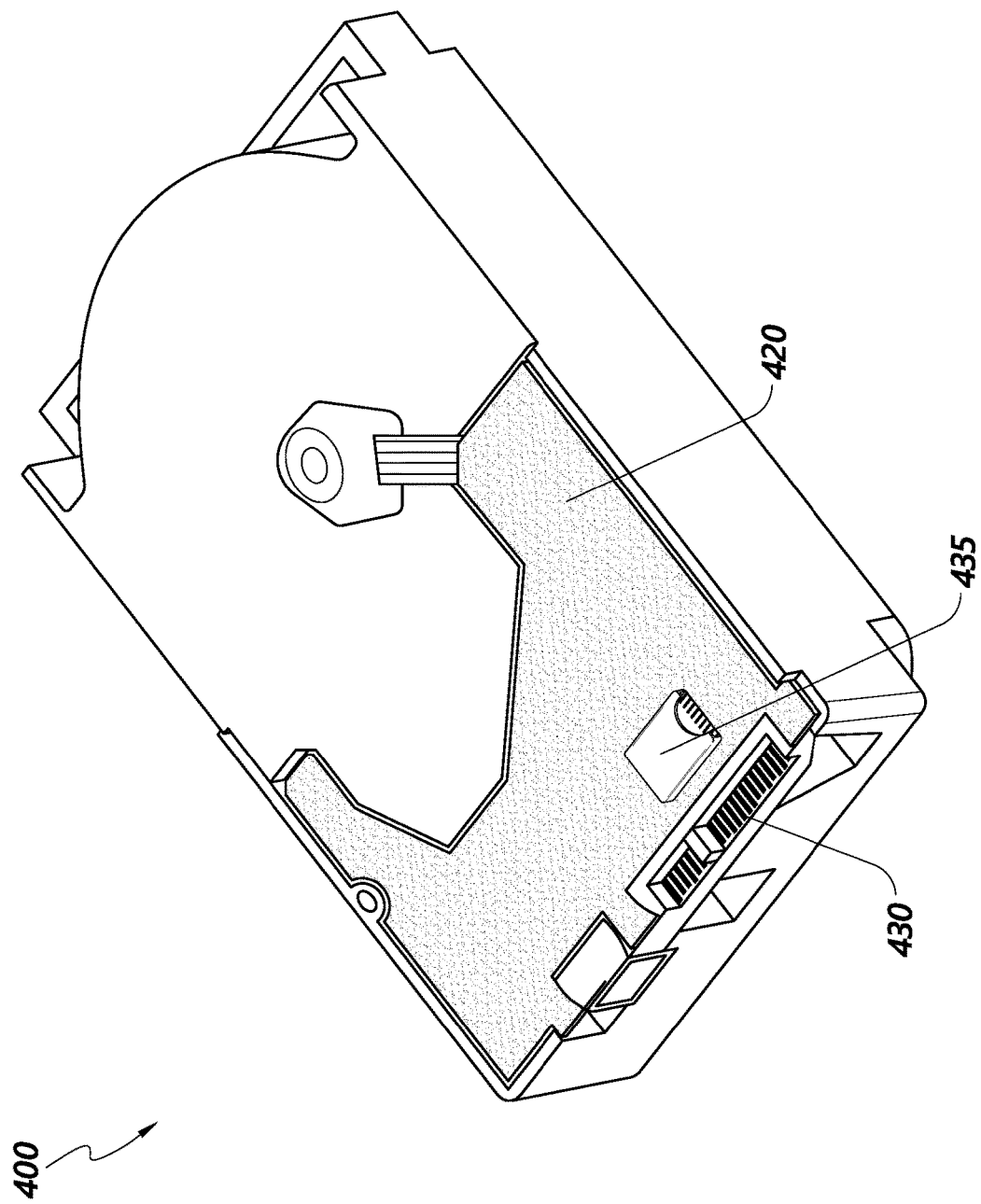
FIG. 4 illustrates a storage device with a removable bridge, in accordance with some embodiments.

FIG. 4 illustrates a storage device 400 with a removable bridge, in accordance with some embodiments. The storage device 400 is shown from a bottom perspective view, showing the exposed surface of the PCBA 420. The removable bridge slot 435 is connected to the PCBA 420. Typically, the other components (e.g. storage controller, memory, etc.) are attached on drive-side surface (not shown) of the PCBA. However, in order to provide easier access to the removable bridge slot 435, the above embodiment has the removable bridge slot 435 connected to the exposed surface of the PCBA rather than the drive-side surface.

In other embodiments, the removable bridge slot 435 may be in other locations. For example, the removable slot can be placed on the drive-side surface, with the slot opening placed along an edge of the device 400 so that the removable bridge can inserted into the bridge slot 435. In some embodiments, the slot opening is on same side as a host interface 430 or on one of the sides perpendicular to that side. By placing the removable bridge slot on the drive-side surface, the removable bridge slot is shielded from damage by the PCBA.

In the illustrated embodiment, the bridge slot 435 uses a microSD form factor. However, different form factors could be used. For example, the form factor could be a nanoSD, SD, Universal Flash Storage (UFS) or even a custom form factor. The removable bridge (not shown) will match the form factor of the bridge slot.

The storage device 400 has a host interface 430 comprising a SATA interface. The host interface is electrically connected to the removable bridge slot 435. For example, the host interface can have traces going to the removable bridge. Likewise, the storage controller (not shown), can have traces going to the removable bridge slot.

In some embodiments, the traces from the host interface and the traces from the storage controller end at the removable bridge slot while not connecting with each other. That is, there is a physical gap or disconnect between the removable bridge and the storage controller. In some embodiments, this physical gap is bridged by insertion of the removable bridge into the bridge slot 435. For example, the removable bridge may have leads that connect a first set of traces from the host interface to a second set of traces from the storage controller.

The storage device 400 of FIG. 4 is one embodiment of the storage device 102 of FIG. 1. As discussed above, many different types of storage devices other than HDDs, such as SSDs or SSHDs, can be used with the storage system 100 of FIG. 1.

In one implementation, the storage device 102 can be internally tested by the storage device manufacturer with a testing bridge inserted into the bridge slot 435, prior to shipment. The testing bridge serves as a "pass through" to complete the electrical connections between the host and the storage controller and enables the device to be tested. Once tested, the testing bridge is removed, and the storage device can be shipped and be ready to receive the removable bridge with custom functions as described above. Once the device is deployed, it may be possible for the testing bridge to be re-inserted for repair or diagnosis purposes, or a separate bridge customized for such field repair/diagnosis purposes can be used. In certain applications, the testing bridge may be used in the field as a "pass through" bridge if the storage device is re-purposed to function without custom functions.

FIG. 5 is a flow diagram illustrating an interception process 500, in accordance with some embodiments of the data storage system 100. The interception process 500 may be performed, for example, by control circuitry of a data storage system 100, such as the storage controller 145 and/or the removable bridge 140.

At block 505, the host system 105 sends a command to the storage controller 145 via the host interface 130. The command may be, for example, a read command or a write command.

At block 510, the removable bridge 140 intercepts the command to the storage interface. As discussed above, in some embodiments, the bridge is electronically inline between the storage controller 145 and the host interface 130 and can intercept messages going to or from those two components. In some embodiments, this interception is transparent to the host system 105 and/or the storage controller.

At block 515, the removable bridge 140 determines whether the command needs to be modified. As discussed above, the removable bridge 140 is programmable by third parties. Such a third-party can install software (e.g., firmware) on the bridge that performs operations desired by the third-party on data stored on the storage device. For example, the third-party can install a custom encryption software that encrypts or decrypts data using the security design of the third-party. As the manufacturer of the storage device did not design the software on the removable bridge, such software is more secure from the perspective of the third-party, as they are the only party that can encrypt or decrypt data stored on the drive.

Other functions can be included on the removable bridge 140, either in lieu of or in addition to the custom encryption function. For example, custom compression/decompression software designed by the third-party can be programmed into the removable bridge.

In one sample scenario, the removable bridge 140 receives a write command, including write data to be written on the storage media 160. The host system 105 is unaware of the encryption process and sends the write data in unencrypted form. The removable bridge 140 determines that the write data needs to be encrypted. The removable bridge 140 then encrypts the data according to the encryption protocol in its custom software.

At block 520, the removable bridge 140 sends the modified/unmodified command to the storage controller 145. For example, if the command is a read operation, then the removable bridge 140 may not need to modify the command and can send an unmodified command. However, if data is to be written to the storage media 160, the removable bridge 140 may need to encrypt the write data and can send a modified command.

In some embodiments, the storage controller 145 is configured to operate according to firmware developed by the manufacturer. As discussed above, the operations of the removable bridge may be transparent to the storage controller. The storage controller receives the data, which may have been encrypted by the removable bridge, and treats it the same as any other data received. For example, the storage controller may not need to track which data is encrypted as decryption will be handled by the removable bridge and not by the storage controller.

At block 525, the storage controller 145 executes the received command. For example, the storage controller may read or write data to the storage media 160.

At block 530, the storage controller optionally sends a response to the host 105. For example, if the command was a read command, the storage controller sends back the requested data.

FIG. 6 is a flow diagram illustrating another interception process 600, in accordance with one or more embodiments of the data storage system 100. The interception process 500 may be performed, for example, by control circuitry of a data storage system, such as the storage controller 145 and/or the removable bridge 140. The interception process of FIG. 6 may follow directly after the interception process of FIG. 5. For example, the process of FIG. 5 may be applied to commands coming to the storage controller 145 while the process of FIG. 6 applies to the response by the storage controller to the received command.

At block 605, the storage controller 145 receives a request or command from the host. For example, the request may be a read command, write command or a status query.

At block 610, the storage controller 145 sends a response to the host. For example, the storage controller may be responding to a read command and sending the requested data to the host system 105.

At block 615, the removable bridge 140 intercepts the response sent by the storage controller 145. The response may include read data being requested by the host system 105.

At block 620, the removable bridge 140 determines whether the response needs to be modified. For example, if the read data is encrypted, the removable bridge 140 applies the decryption protocol to the read data to create modified, unencrypted data. The removable bridge may also decompress data, if needed. However, if the response is for a status query, the removable bridge 140 may not need to modify the response.

At block 625, the removable bridge 140 sends the modified/unmodified response to the host 105. For example, the removable bridge 140 may have modified the response by unencrypting or uncompressing data contained in the response. However, in some situations, no modification of the response is needed and the removable bridge 140 just passes through the response.

Additional Embodiments

The systems and methods of this disclosure may be useful in hard drives, hybrid drives, and solid-state memory drives. As used in this application, "non-volatile solid-state memory," "non-volatile memory," "non-volatile memory die", "NVM," "solid-state memory," "solid-state data storage," "semiconductor memory die" or variations thereof may refer to solid-state memory such as NAND flash. Solid-state memory may comprise a wide variety of technologies, such as flash integrated circuits, Phase Change Memory (PCM, PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), or other discrete NVM (non-volatile solid-state memory) chips. Other forms of storage (e.g., battery backed-up volatile DRAM or SRAM devices, magnetic disk drives, etc.) may additionally or alternatively be used.

Those skilled in the art will appreciate that in some embodiments, other types of data storage systems and/or memory addressing schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A storage device comprising:
   a storage medium;
   a storage controller configured to control read and write operations to the storage medium, wherein the storage controller is configured to operate according to a firmware;
   a host interface configured to receive commands via a cable from a host system;
   one or more traces between the storage controller and the host interface, the one or more traces disconnected by a physical gap;
   a bridge slot configured to receive a removable bridge, the removable bridge configured to:
      physically connect across the physical gap, via leads, the one or more traces between the storage controller and the host interface;
      receive, from the storage controller, a first authentication result calculated using a randomly generated number subsequent to insertion of the removable bridge into the bridge slot, the randomly generated number generated by a random number generator;
      independently calculate a second authentication result using the randomly generated number; and
      determine whether to authorize an unlock command to the storage controller based on a comparison of the first authentication result and the second authentication result; and
   a printed circuit board assembly (PCBA) comprising the storage controller, the host interface, the one or more traces, and the bridge slot.

2. The storage device of claim 1, wherein the removable bridge is further configured to:
   intercept a first command sent from the host system to the storage controller;
   modify the first command according to software stored on the removable bridge; and
   transmit the modified first command to the storage controller.

3. The storage device of claim 2, wherein:
   the first command comprises a write command and write data; and
   modifying the first command comprises encrypting the write data.

4. The storage device of claim 1, wherein the removable bridge is further configured to:
   intercept a data packet sent to the host system by the storage controller in response to a read request;
   decrypt the data packet; and
   transmit the decrypted data packet to the host system.

5. The storage device of claim 1, wherein the firmware is written by a storage device manufacturer and software stored on the removable bridge is written by a third-party different from the storage device manufacturer.

6. The storage device of claim 5, wherein the removable bridge comprises:
   memory storing the software from the third-party, the software comprising instructions for modifying intercepted commands; and
   a controller configured to modify the intercepted command according to the software from the third-party.

7. The storage device of claim 2, wherein:
   the first command comprises a write command and write data; and
   modifying the first command comprises compressing the write data.

8. The storage device of claim 1, wherein:
   in a first configuration, with the removable bridge not in the bridge slot, the host interface is physically disconnected from the storage controller; and
   in a second configuration, with the removable bridge in the bridge slot, the host interface is physically connected to the storage controller via the leads of the removable bridge.

9. The storage device of claim 1, wherein the storage device is one of a hard disk drive (HDD), a solid state drive (SSD), and a solid state hybrid drive (SSHD).

10. The storage device of claim 1, wherein the bridge slot uses a microSD or Universal Flash Storage (UFS) format.

11. The storage device of claim 1, wherein the storage controller is further configured to:
    receive an unlock command and a password;
    determine whether the password is correct;
    in response to determining that the password is correct, unlock the storage medium of the storage device; and
    in response to determining that the password is incorrect, keep the storage medium inaccessible.

12. A method for authenticating a removable bridge of a storage device, the storage device comprising a storage controller configured to run firmware and the removable bridge configured to run software, the method comprising:
    receiving the removable bridge in a bridge slot of the storage device, the removable bridge configured to physically connect one or more traces between the storage controller and a host interface, the one or more traces disconnected by a physical gap;
    receiving, from the storage controller, a first authentication result calculated using a randomly generated number, the randomly generated number generated by a random number generator;
    independently calculating a second authentication result using the randomly generated number; and
    determining whether to authorize an unlock command to the storage controller based on a comparison of the first authentication result and the second authentication result;
    wherein the storage controller, the host interface, the one or more traces, and the bridge slot are part of a same printed circuit board assembly (PCBA).

13. The method of claim 12, further comprising:
    receiving, on the host interface of the storage device, a first command from a host system to the storage controller;
    intercepting, at the removable bridge, the first command;
    modifying the first command according to the software in the removable bridge; and
    transmitting the modified first command to the storage controller.

14. The method of claim 12, further comprising:
    intercepting a data packet sent to a host system by the storage controller in response to a read request;
    decrypting the data packet; and
    transmitting the decrypted data packet to the host system.

15. The method of claim 12, wherein the removable bridge comprises:
    memory storing the software, the software and the firmware written by different parties, the software comprising instructions for modifying intercepted commands; and
    a controller configured to modify the intercepted command according to the software.

16. The method of claim 13, wherein:

the first command comprises a write command and write data; and modifying the first command comprises compressing the write data.

17. The method of claim 12, further comprising:

sending an unlock command and a password to the storage controller;

determining whether the password is correct;

in response to determining that the password is correct, unlocking storage media of the storage device; and in response to determining that the password is incorrect, keeping the storage media inaccessible.

18. The method of claim 13, wherein:

the first command comprises a write command and write data; and modifying the first command comprises encrypting the write data.

19. A storage device comprising:

storage means;

controlling means configured to control read and write operations to the storage means, wherein the controlling means operates according to a firmware;

an interface means configured to receive commands from a host system;

one or more traces between the controlling means and the interface means, the one or more traces disconnected by a physical gap;

a receiving means configured to receive a removable processing means, the removable processing means configured to:

physically connect across the physical gap, via leads, the one or more traces between the controlling means and the interface means;

receive, from the controlling means, a first authentication result calculated using a randomly generated number subsequent to insertion of the removable processing means into the receiving means, the randomly generated number generated by a random number generator;

independently calculate a second authentication result using the randomly generated number; and determine whether to authorize an unlock command to the controlling means based on a comparison of the first authentication result and the second authentication result; and a printed circuit board assembly (PCBA) comprising the controlling means, the interface means, the one or more traces, and the receiving means.

20. The storage device of claim 19, wherein the removable processing means is further configured to:

intercept a first command sent from the host system to the controlling means;

modify the first command according to software stored on the removable processing means; and transmit the modified first command to the controlling means.

\* \* \* \* \*